United States Patent
Mathias et al.

(10) Patent No.: US 11,425,104 B2
(45) Date of Patent: *Aug. 23, 2022

(54) SECURE TRANSFER OF A DATA OBJECT BETWEEN USER DEVICES

(71) Applicant: Apple Inc., Cupertino, CA (US)

(72) Inventors: Arun G. Mathias, Los Gatos, CA (US); Thomas A. Dilligan, Cupertino, CA (US); Matthew C. Lucas, San Jose, CA (US); Anush G. Nadathur, Campbell, CA (US); Kevin P. McLaughlin, Waikoloa, HI (US)

(73) Assignee: Apple Inc., Cupertino, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/654,683

(22) Filed: Oct. 16, 2019

(65) Prior Publication Data

US 2020/0053056 A1    Feb. 13, 2020

Related U.S. Application Data

(63) Continuation of application No. 15/274,388, filed on Sep. 23, 2016, now Pat. No. 10,462,109.

(Continued)

(51) Int. Cl.
*H04L 29/06* (2006.01)
*H04L 29/08* (2006.01)
(Continued)

(52) U.S. Cl.
CPC ........ *H04L 63/0428* (2013.01); *H04L 9/0827* (2013.01); *H04L 9/0894* (2013.01);
(Continued)

(58) Field of Classification Search
USPC .................................................. 713/168–171
See application file for complete search history.

(56) References Cited

U.S. PATENT DOCUMENTS

| 7,123,878 B1 | 10/2006 | Heinonen et al. |
| 7,581,095 B2 | 8/2009 | Billhartz |

(Continued)

OTHER PUBLICATIONS

A Survey on Secure Communication Protocols for IoT Systems, Dragomir et al, Jan. 2016 (Year: 2016).*

(Continued)

*Primary Examiner* — Jahangir Kabir
(74) *Attorney, Agent, or Firm* — Kilpatrick Townsend & Stockton LLP

(57) ABSTRACT

A data transfer process can include multiple verification features usable by a "source" device to ensure that a "destination" device is authorized to receive a requested data object. The source device and destination device can communicate via a first communication channel (which can be on a wide-area network) to exchange public keys, then use the public keys to verify their identities and establish a secure session on a second communication channel (which can be a local channel). The data object can be transferred via the secure session. Prior to sending the data object, the source device can perform secondary verification operations (in addition to the key exchange) to confirm the identity of the second device and/or the locality of the connection on the second communication channel.

22 Claims, 8 Drawing Sheets

Related U.S. Application Data

(60) Provisional application No. 62/348,991, filed on Jun. 12, 2016.

(51) Int. Cl.

| | | |
|---|---|---|
| *H04L 9/40* | (2022.01) | |
| *H04L 67/06* | (2022.01) | |
| *H04L 67/1095* | (2022.01) | |
| *H04L 67/10* | (2022.01) | |
| *H04L 9/12* | (2006.01) | |
| *H04L 9/08* | (2006.01) | |
| *H04L 9/32* | (2006.01) | |

(52) U.S. Cl.
CPC .............. *H04L 9/12* (2013.01); *H04L 9/3215* (2013.01); *H04L 63/06* (2013.01); *H04L 63/061* (2013.01); *H04L 63/083* (2013.01); *H04L 63/18* (2013.01); *H04L 67/06* (2013.01); *H04L 67/10* (2013.01); *H04L 67/1095* (2013.01)

(56) References Cited

U.S. PATENT DOCUMENTS

| | | | |
|---|---|---|---|
| 2004/0073672 A1 | 4/2004 | Fascenda | |
| 2004/0215974 A1* | 10/2004 | Conley | H04L 63/18 726/4 |
| 2004/0221154 A1 | 11/2004 | Aggarwal | |
| 2006/0174116 A1* | 8/2006 | Balfanz | H04L 69/329 713/168 |
| 2006/0174323 A1 | 8/2006 | Brown et al. | |
| 2007/0133803 A1* | 6/2007 | Saito | H04L 61/1511 380/267 |
| 2008/0098212 A1 | 4/2008 | Helms et al. | |
| 2008/0178004 A1 | 7/2008 | Wei et al. | |
| 2009/0006263 A1 | 1/2009 | Power et al. | |
| 2011/0225423 A1* | 9/2011 | Lynch | H04L 63/04 713/171 |
| 2015/0271667 A1 | 9/2015 | Bernsen | |
| 2015/0334097 A1 | 11/2015 | Mundhra et al. | |
| 2015/0372811 A1 | 12/2015 | Le Saint et al. | |
| 2016/0242030 A1 | 8/2016 | Pang et al. | |
| 2016/0255502 A1 | 9/2016 | Rajadurai et al. | |
| 2016/0307194 A1* | 10/2016 | Bhatnagar | H04L 63/0838 |

OTHER PUBLICATIONS

First Action Interview Office Action Summary dated Mar. 1, 2019 in U.S. Appl. No. 15/274,388. 3 pages.
First Action Interview Pilot Program Pre-Interview Communication dated Oct. 31, 2018 in U.S. Appl. No. 15/274,388. 4 pages.
Notice of Allowance and Fees Due dated Jun. 19, 2019 in U.S. Appl. No. 15/274,388. 17 pages.

* cited by examiner

SECURE TRANSFER OF A DATA OBJECT BETWEEN USER DEVICES

CROSS-REFERENCES TO RELATED APPLICATIONS

The present disclosure is a continuation of U.S. patent application Ser. No. 15/274,388 filed Sep. 23, 2016 know U.S. Pat. No. 10,462,109) entitled "SECURE TRANSFER OF A DATA OBJECT BETWEEN USER DEVICES," which is a non-provisional of and claims the benefit and priority under 35 U.S.C. 119(e) of U.S. Provisional Application No. 62/348,991 filed Jun. 12, 2016 entitled "SECURE TRANSFER OF A DATA OBJECT BETWEEN USER DEVICES," the entire contents of which are incorporated by reference herein in their entirety. This disclosure is also related to the following U.S. patent applications: Application Ser. No. 14/614,914 (now U.S. Pat. No. 9,979,625) filed Feb. 5, 2015; Application Ser. No. 14/725,891 (now U.S. Pat. No. 10,177,933), filed May 29, 2015; and Application Ser. No. 14/725,912 (now U.S. Pat. No. 10,454,783), filed May 29, 2015. The disclosures of these applications are incorporated by reference herein in their entirety.

BACKGROUND

The present disclosure relates generally to data transfers and in particular to secure transfer of a data object between user devices.

Personal electronic devices, such as smart phones, tablet computers, wearable devices, and the like, are everywhere. Even set-top boxes used to provide inputs from various sources to a television (TV) monitor may be personalized for a particular user. It is not uncommon for a given user to have several personal electronic devices. It may be desirable to automatically transfer data between these devices, so that the data is available to the user no matter which device she happens to be using at a given time.

In some cases, automatic data transfer can be accomplished by synchronizing data with a cloud-based data management service. The cloud-based data management service can store user account information including a list of user devices that have been registered to the user account and can also store data for the user. The data stored in the cloud (including any updates made to the data) can be automatically propagated to all of the registered user devices using synchronization processes known in the art.

SUMMARY

In some instances, however, it may not be possible for a particular user device to obtain certain user data via cloud synchronization. For example, different user devices may run different operating system software, and a particular operating system might not support obtaining certain data objects via cloud synchronization. In other instances, it may be preferable not to store the data in the cloud at all. Thus, alternatives to cloud-based synchronization for transferring data objects between user devices may be desirable.

Certain embodiments of the present invention relate to secure transfer of data objects between user devices. The data transfer process can include multiple verification features usable by a "source" device (i.e., a user device that has a given data object) to ensure that a "destination" device (i.e., a user device that has requested the data object) is authorized to receive it. In some embodiments, these verification features do not require user action, so that the transfer of the data object can occur automatically and without the user being aware.

In some embodiments, a source device and a destination device can each be capable of communicating via a first communication channel, which can be a wide-area communication channel that requires participation of a particular server or server system (or other system) between the endpoints. For example, both devices can be registered with a message relay service that provides an authenticated communication channel between registered devices connected to a wide-area network (such as the internet), and the authenticated communication channel can be used as the first communication channel. The source device and destination device can also be capable of communicating via a second communication channel that is independent of the first communication channel, in the sense that the required server associated with the first communication channel is expected to be unable to intervene in or otherwise interfere with the second communication channel. For example, if the first communication channel requires the participation of a particular server or server system (or other system) that is connected via a wide-area network but not via a local network (e.g., a Wi-Fi network or other wireless LAN), the second communication channel can be via the local network. In some embodiments, the second communication channel can be a point-to-point local communication channel (e.g., a Bluetooth channel or a wired channel). In some embodiments, the channels can be independent in the sense that certificates and/or other identity verification techniques used to verify device identity on the first communication channel are not used on the second communication channel. The second communication channel can use different certificates and/or identity verification techniques. In some embodiments, the second communication channel can be a local communication channel, such as a local network (e.g., a Wi-Fi network or other wireless LAN) or a point-to-point communication channel (e.g., a Bluetooth channel or a wired channel).

In some embodiments, the destination device can send a request message to the source device (or to multiple user devices that might be able to provide the data object) via the first communication channel. The request message can indicate that the destination device is requesting transfer of a particular data object and can include a request identifier assigned by the destination device. Upon receiving the request message, a user device can store an internal indicator of the request.

Thereafter, a source device (which can be any user device that has the requested data object and that stored the internal indicator) can detect a request from the destination device on a local network. For example, the destination device can broadcast a request on a local network. In response to detecting the request on the local network, the source device can establish a second communication channel, via the local network, with the destination device. The source and destination devices can exchange public keys via the first communication channel, then use the public keys to establish a secure communication session on the second communication channel. The source device can send the data object to the destination device via the secure communication session. In some embodiments, prior to establishing the secure communication session, the source device can perform secondary verification operations to verify that the destination device is the device it purports to be and/or that the second communication channel is a channel that is considered "safe" from interference or intervention by devices associated with the first communication channel. Such operations can include, e.g., communicating with other devices that are expected to be present on the local network with the destination device, determining whether a geolocation of the source device corresponds to an expected geolocation of the destination device, and so on. The particular verification operations can depend on the degree of security desired.

Some embodiments relate to a specific use-case in which the user devices are operable to control an automated environment, such as a home. The automated environment can include a number of controllable accessories (such as lights, doors and/or door locks, security cameras, thermostats, appliances, and so on) with which the user devices can communicate to send control messages that allow the user devices to remotely operate the accessories. In order to operate the accessories, the user devices may require various information about the accessories, such as identifiers (e.g., name, public key, location within the environment), configuration data (e.g., a descriptor of the accessory's characteristics and control options), and so on. Further, for automated operations, the user devices may require information defining the automated operations to be performed (including, e.g., information defining events and/or conditions under which a given set of operations should be performed). All of the information that may be needed for user devices to control accessories in a particular automated environment can be stored in the cloud as an "environment data bundle" that is encrypted to protect user privacy. The encrypted environment data bundle can be synchronized among the various devices belonging to users associated with the environment using cloud-based synchronization techniques. However, in order to make use of the environment data bundle, a user device also requires the appropriate key to decrypt the environment data bundle, and there may be various conditions where it is not desirable or practical to provide the key (also referred to as an "environment key") via cloud-based synchronization. Techniques described herein can be used to provide a key from one user device to another, without user intervention. In such cases, the presence on a local network of accessories associated with the automated environment can be used as secondary verification that the source device (and by implication the destination device) is located in the automated environment.

The following detailed description, together with the accompanying drawings, will provide a further understanding of the nature and advantages of the claimed invention.

DETAILED DESCRIPTION

System Overview

Figure 1:
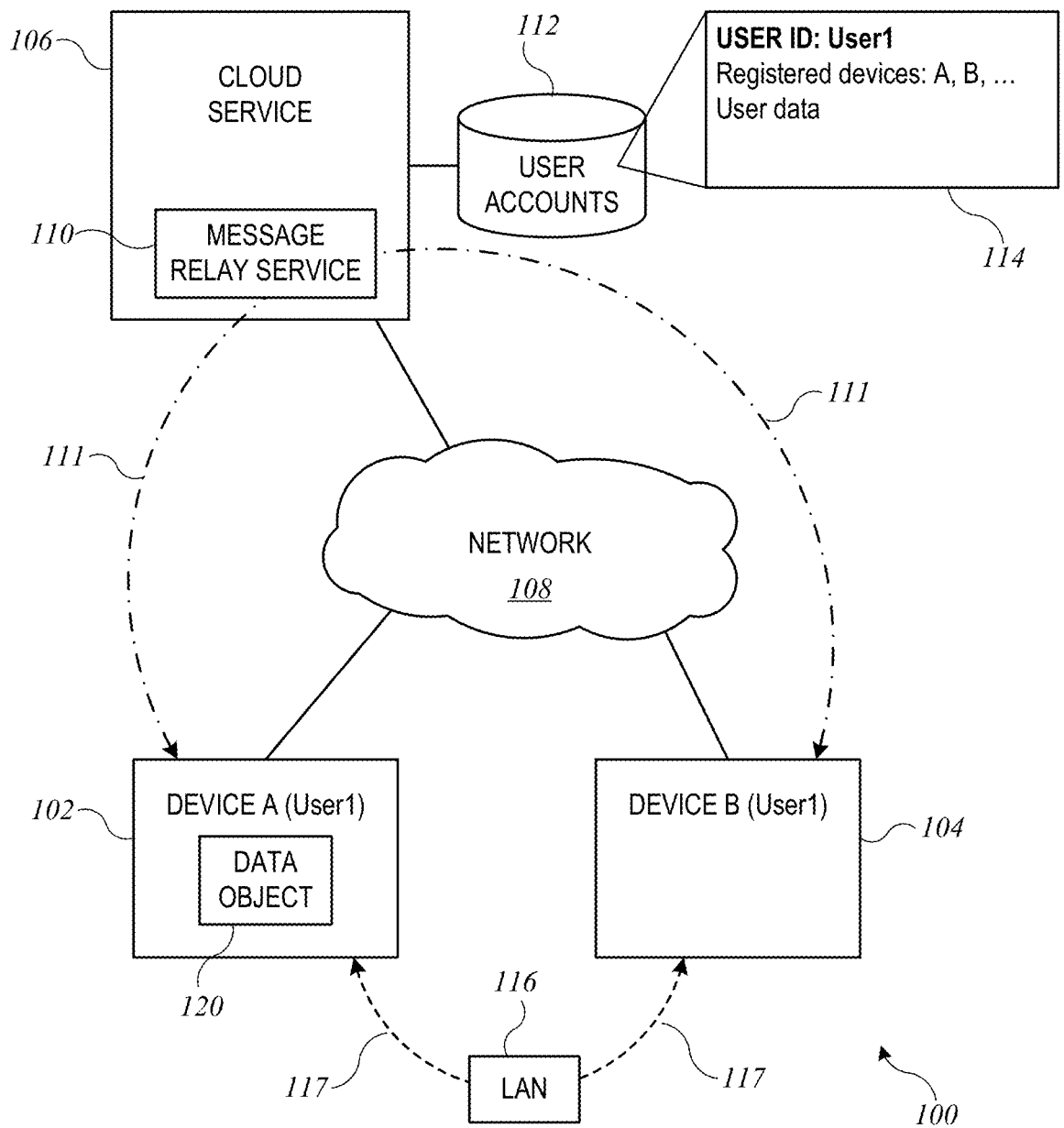
FIG. 1 shows a system according to an embodiment of the present invention.

FIG. 1 shows a system 100 according to an embodiment of the present invention. System 100 includes user devices 102, 104 and a cloud service 106 communicating via a network 108 (e.g., the internet).

Each of user devices 102, 104 can be for example, a desktop computer, laptop computer, tablet computer, smart phone, wearable computing device, personal digital assistant, set-top box (which can be a device that connects to a television (TV) monitor to provide video input, including, e.g., input obtained via network 108) or any other computing device that is operable by a user.

Cloud service (or "cloud-based service") 106 can be implemented using one or more servers or server farms that can communicate with user devices 102, 104 via network 108. The various servers of cloud service 106 can provide users with access to data and/or functionality. For example, cloud service 106 can implement a message relay service 110 that securely delivers messages between various user devices that have been registered with cloud service 106, as indicated by broken arrows 111. In some embodiments, the user can access cloud service 106 whenever a user device 102, 104 has a connection to network 108. Access to and communication with cloud service 106 can be managed at the application and/or operating system level of user device 102, 104, and some interactions can be transparent to the user. Further, even where the user is actively participating in an interaction, the user does not need to know specifically where the servers and/or data stores of cloud service 106 are located. (Hence, such services are commonly referred to as being "in the cloud.")

In some embodiments, cloud service 106 can maintain a data store 112 of user accounts. Data store 112 can include an account record 114 for each user who has established an account with cloud service 106. Account record 114 can be keyed to a user identifier (user ID) and can store various information about the user and/or the account. For example, in some embodiments, a user (with userID "User1" in this example) can register a user device (e.g., devices 102, 104) with cloud service 106, and cloud service 106 can store information about each registered user device, such as a device address, serial number or other unique device identifier (e.g., a mobile phone number) that can be used to send data to the device. Registration of a user device to a user account can be achieved using various techniques. For instance, a particular user device can be automatically registered to the user account when the user first signs in to cloud service 106 from that device. Alternatively, a user may have the option to choose to register a particular device with cloud service 106.

Account record 114 can also store other information about and/or for a user. For example, cloud service 106 may provide a data repository service where the user can store data that can be accessed from any user device that can communicate with cloud service 106. Account record 114 can include the user data or references to storage locations where the user data can be found. Any other type of information can also be stored.

One example of a cloud-based service usable in connection with some embodiments of the present invention is the iCloud® online service of Apple Inc., assignee of the present application. In this example, message relay service 110 can be implemented using the same servers and operations that are used to support the iMessage® feature of various user devices made by Apple Inc. The iCloud® online service can also provide access to various other services such as data storage and synchronization, music services, and other services not relevant to the present disclosure. It is to be understood that other cloud-based services can also support various operations described herein and that use of a specific cloud service is not required.

Message relay service 110 can be any service that relays messages via a wide-area network (e.g., network 108) in such a manner that participation of a server or server system (or other system) associated with message relay service 110 is required. "Participation" can include, e.g., receiving and routing messages, verifying digital certificates, or other operations that may occur in connection with each relayed message.

For purposes of the present description, it is assumed that user devices 102, 104 are two different devices registered to the same user account ("User1") at cloud service 106. For example, user device "A" 102 can be a mobile phone, while user device "B" 104 can be a set-top box, desktop computer, or any other device that the user can register to the account at cloud service 106. From time to time, user devices 102 and 104 may be in close enough proximity to communicate via a local area network (LAN) 116, as indicated by dashed arrows 117. LAN 116 can be, for example, a wireless LAN implemented using Wi-Fi® networking standards and protocols promulgated by the Wi-Fi Alliance (referred to herein as a "Wi-Fi network").

It is also assumed that user device 102 (also referred to as a "source" device) has a locally stored data object 120. Data object 120 can be, for example, a cryptographic key usable to encrypt and/or decrypt user data stored in encrypted form at cloud service 106. Data object 120 can also be another type of data object, such as a medical data record, payment card information for a payment card of the user, or any other data object. For purposes of the present description, it is assumed that it is desirable for source device 102 to be able to provide data object 120 to user device 104 (also referred to as a "destination" device), and the particular content of data object 120 is not relevant. While transferring a data object between devices can be done using a variety of existing protocols and techniques, such protocols and techniques may not provide adequate security. For example, it may be desirable to prevent source device 102 from transferring the data object until the identity of destination device 104 has been verified. It may also be desirable to perform the transfer without requiring the user to be actively involved.

In accordance with certain embodiments of the present invention, source device 102 and destination device 104 can manage the transfer of data object 120 using a set of multiple messages, some of which are exchanged via message relay service 110 and some of which are exchanged via LAN 116. This can provide a multi-prong identity verification process that creates a high degree of trust by source device 102 that destination device 104 is authorized to receive data object 120. Examples of secure transfer processes will now be described.

Example Data Transfer Process

Figure 2A:
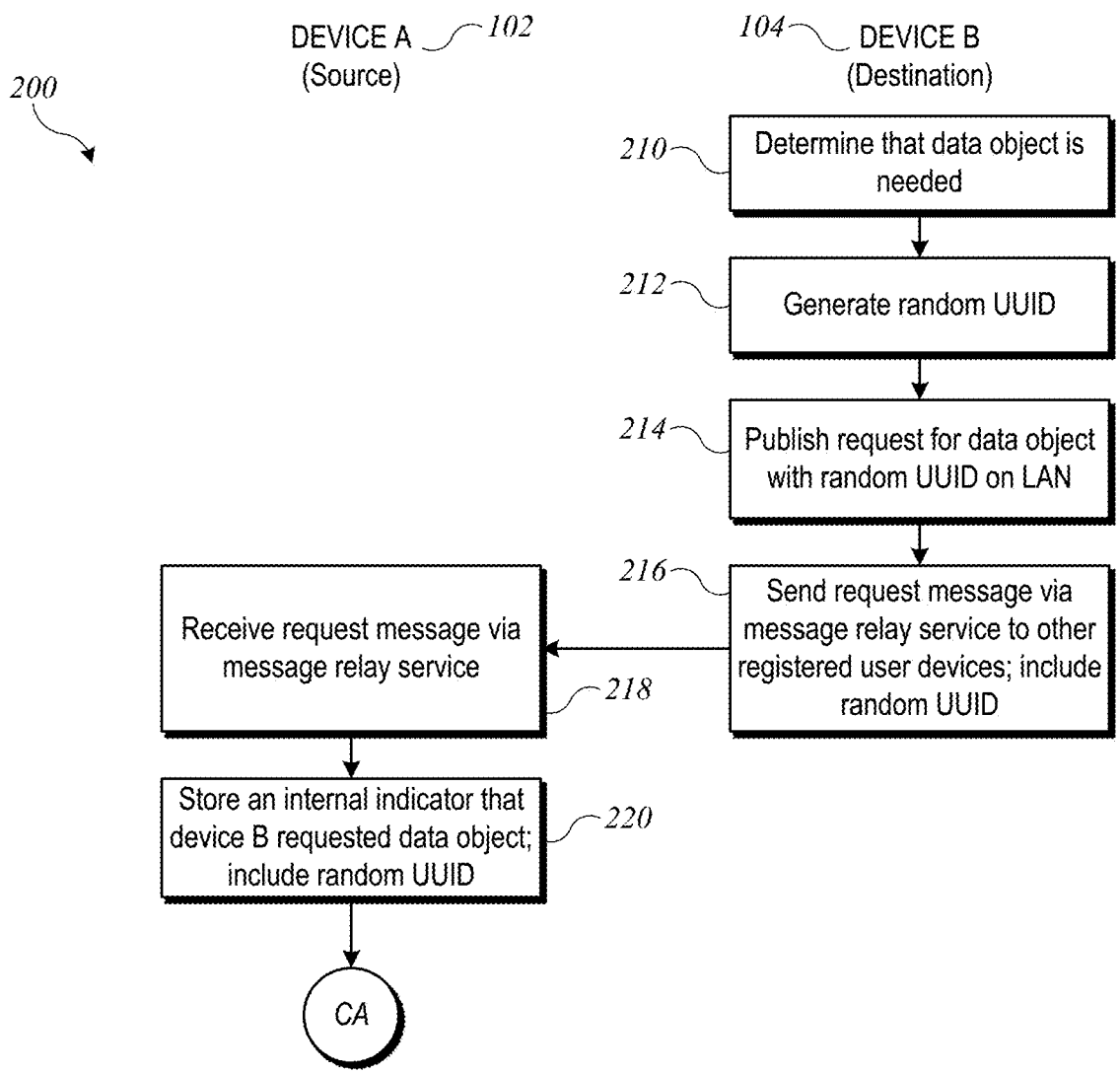
FIGS. 2A and 2B show a flow diagram of a process for transferring a data object from a source device to a destination device according to an embodiment of the present invention.
Figure 2B:
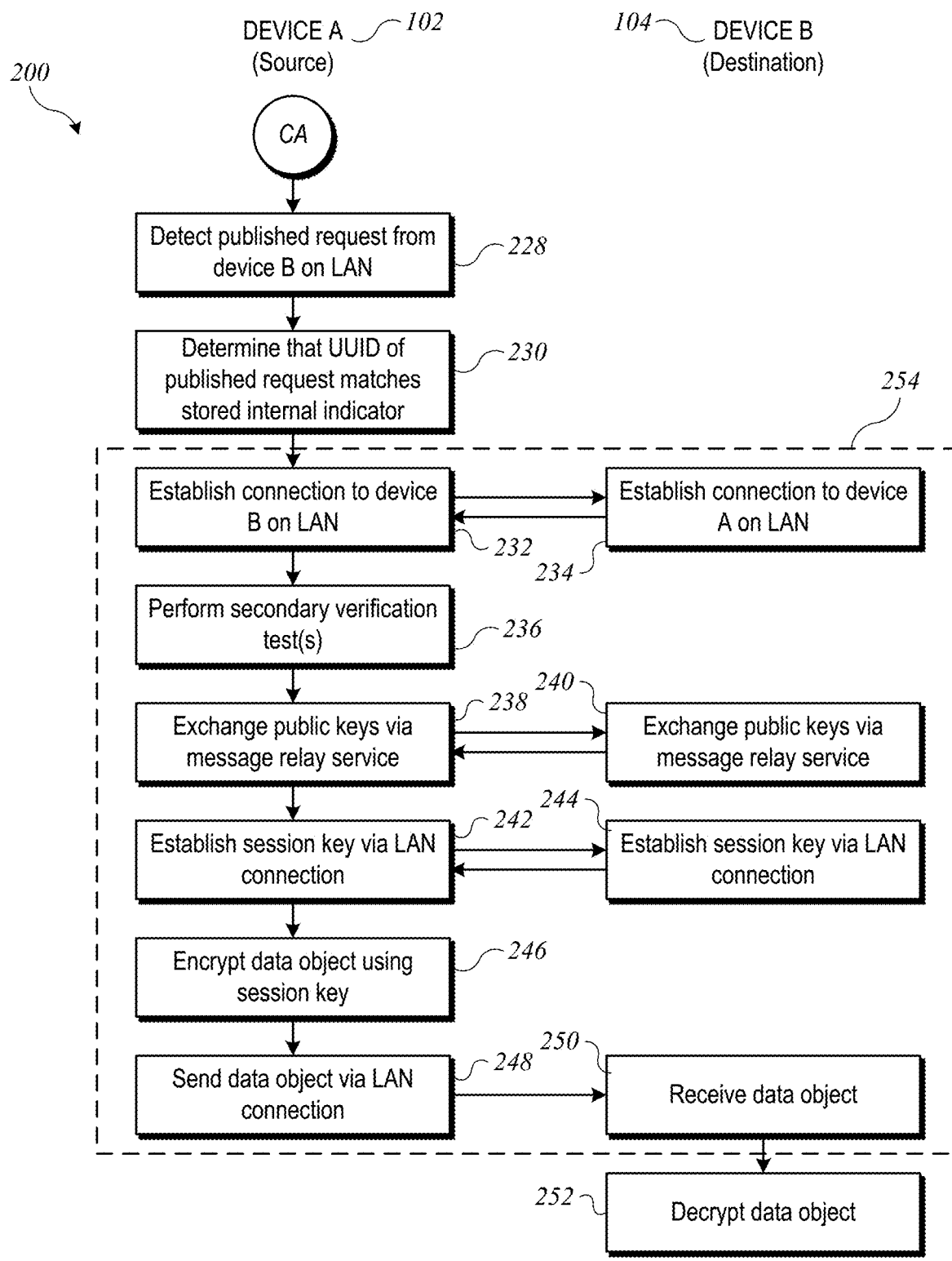

FIGS. 2A and 2B show a flow diagram of a process 200 for transferring a data object (e.g., data object 120) from a "source" device (e.g., user device 102) to a "destination" device (e.g., user device 104) according to an embodiment of the present invention. Process 200 can be implemented using program code executable on user devices 102, 104 and supporting services such as message relay service 110.

Referring first to FIG. 2A, process 200 can begin at block 210, when destination device 104 determines that data object 120 is needed and that data object 120 may be stored on another user device (e.g., source device 102). In response to making this determination, destination device 104 can create a request to obtain data object 120. For instance, at block 212, destination device 104 can generate a random identifier, which can be a universally unique identifier (UUID) or another identifier that becomes associated with the particular request. At block 214, destination device 104 can publish a request for the data object on LAN 116. The published request can include the random identifier. In some embodiments, the published request can conform to the Bonjour® networking service of Apple Inc.; other networking services and protocols can be used, provided that the user device 102 that will act as the source device can receive and interpret the published request.

At block 216, destination device 104 can send a request message via message relay service 110 to one or more other user devices associated with the same user ID as destination device 104. The request message can include the random identifier generated at block 212. The infrastructure used by message relay service 110 can be the same infrastructure that is used to deliver other types of messages (e.g., text messages) between devices of different users. In this instance, however, the one or more devices that receive the request message are registered to the same user ID as the device that sent it; the request message can be sent to any or all of the devices registered to the user ID of the device that originated the request message to message relay service 110.

A device that receives the request message can process it internally, without notifying the user that the request message was received. For example, at block 218, source device 102 can receive the request message via message relay service 110.

Source device 202 might or might not be able to act on the request immediately. For example, as described below, transferring of data object 120 can require that source device 202 and destination device 204 be connected via LAN 116 (or some other local communication channel). Because message relay service 110 operates on a wide-area network (e.g., the internet), it is possible that source device 202 may receive the request message at a time when source device 202 is not able to connect to LAN 116. Accordingly, at block 220, source device 102 can store an internal indicator that destination device 104 has requested data object 120; the internal indicator can include the random identifier that was received in the request message. In some embodiments, the request message can include an identifier of the data object being requested, and any user device that receives a request message can ignore the request message if it does not have the requested data object. It is to be understood that multiple user devices may each have a copy of the requested data object, and multiple user devices may each store an internal indicator in response to a single request message. In some embodiments, the internal indicator can be stored indefinitely; in other embodiments, the internal indicator may be deleted or invalidated after a timeout period (e.g., 8 hours, 24 hours or the like), and destination device 104 can renew the request if it has not obtained the requested data object within the timeout period.

Referring to FIG. 2B, process 200 can continue (node CA) at block 228. Block 228 can occur at any time when source device 102 is connected to LAN 116 after having stored the internal indicator at block 220. At block 228, source device 102 can detect the request for data object 120 that was published on LAN 116 by destination device 104 at block 214. At block 230, source device 102 can determine that the random identifier of the published request on LAN 116 matches the random identifier for the internal indicator that was stored at block 220. Based on this determination, source device 102 can initiate communication with destination device 104 to transfer the requested data object.

For example, at blocks 232 and 234, source device 102 and destination device 104 can establish a connection via LAN 116. In some embodiments, the secure socket connection can conform to the Transport Layer Security (TLS) protocol as defined in the Internet Engineering Task Force RFC 5246 and RFC 6176; other secure connection protocols can be used. The channel itself does not need to be secure; as will become apparent, the data transfer can be secure even if the channel itself is not.

At block 236, source device 102 can perform one or more secondary verification tests. Any operation that provides increased confidence that LAN 116 is a communication channel that is considered safe from interference or intervention by servers or server systems (or other systems) that provide message relay service 110 and/or that destination device 104 is the device it purports to be (i.e., a device that is associated with the user of source device 102 and/or a device that should be allowed to access data object 120) can be used as a verification test. Some verification tests can be performed without communicating with destination device 104. For example, in some embodiments, destination device 104 may be a device that is installed in a particular location (e.g., the user's home), and source device 102 can verify its own presence in the user's home by detecting the presence of one or more other devices (e.g., accessory devices that are installed in the home and with which source device 102 can communicate) that are expected to be present in the user's home. As another example, if destination device 104 is expected to be installed in a particular geographic location, source device 102 can determine whether it is in proximity to that geographic location, e.g., by using a built-in Global Positioning System (GPS) receiver or the like. As yet another example, source device 102 may require that the connection at block 232 be established on a particular LAN (e.g., a LAN that has previously been identified as the wireless network installed in the user's home). Other techniques, such as RF fingerprinting, can be used to determine whether source device 102 is in a "trusted" location (i.e., a location such that a provider of the message relay service is expected to be unable to intervene in local communications and/or such that destination device 104 is expected to be a device that belongs to or is controlled by the correct user).

Another type of secondary verification test can include confirming that the purportedly local connection to destination device 104 is in fact local. For instance, source device 102 can measure the round trip time for communications on the connection established at blocks 232 and 234; for some channels, a long round-trip time may be indicative of a non-local connection. As another example, other devices can be present on the LAN in addition to source device 102 and destination device 104, and source device 102 can communicate with one or more of these other devices to determine whether they also detect the presence of destination device 104 on the LAN. Still another example can incorporate an inherently range-limited communication channel such as a wireless transport protocol such as the Bluetooth® Classic or Bluetooth® Smart communication protocol and standards promulgated by the Bluetooth SIG (referred to herein as "Bluetooth" and "Bluetooth LE"). If source device 102 and destination device 104 both support Bluetooth or Bluetooth LE communication, source device 102 can attempt to detect an advertisement on the range-limited channel from destination device 104.

In some embodiments, the secondary verification tests can include a prompt to the user to confirm that destination device 104 should receive the data object; however, for some applications it may be desirable to make the testing (and other portions of process 200) transparent to the user.

The number and type of secondary verification tests can be chosen as desired and may depend on the desired degree of security, which in turn may depend on the sensitivity of the information contained in the data object to be transferred. In some embodiments, presence of source device 102 and destination device 104 on the same LAN may be considered sufficient verification, and block 236 can be omitted.

Although not expressly shown in FIG. 2B, if the secondary verification test at block 236 fails, source device 102 can abort the connection to destination device 104 without transferring a data object. Thereafter, source device 102 can return to block 228, or a different source device can perform block 228 at any later time.

Assuming that the secondary verification test at block 236 succeeds, source device 102 can continue the operation. For instance, at block 238, source device 102 can initiate a public key exchange with destination device 104 via message relay service 110, and destination device 104 can participate in the public key exchange at block 240. During the public key exchange, each device sends to the other the public key of a public/private cryptographic key pair (while keeping the private key secret). In some embodiments, destination device 104 can generate a "transient" public/private key pair specifically for use in the data transfer process while source device 102 uses a persistent public/private key pair that it locally stores (e.g., in a secure storage device) and may use for other purposes (such as communicating with accessories in the user's home, as described below). In other embodiments, destination device 104 can use a persistent key pair while source device 102 uses a transient key pair, or both devices can use transient key pairs. In still other embodiments, both devices can use persistent key pairs, although this may increase security risks.

It should be noted that the public key exchange does not take place via LAN 116 but via another, independent communication channel (in this case message relay service 110). In some embodiments, source device 102 can send the key exchange message to the destination device from which the request message was received at block 218, without relying on any identifiers received from device 104 via LAN 116. As a result, if a device on LAN 116 attempts to impersonate user device 104, it is expected that source device 102 will send its public key to the real user device 104, which means that the impostor will not receive the key it needs from source device 102 and (as will become apparent) will not be able to continue process 200. Further, the impostor may not have access to message relay service 110, or it may be prevented by message relay service 110 from sending the message containing its public key to source device 102. Accordingly, performing the public key exchange via a separate communication channel that is independent of the channel used to transfer the data object can provide added protection against impostors attempting to obtain data object 120, as the impostor would also have to compromise the key-exchange channel. In some implementations, this may require compromising the infrastructure of message relay service 110.

At blocks 242 and 244, source device 102 and destination device 104 can use the public keys exchanged at blocks 238 and 240 to establish an encrypted communication session via the connection on LAN 116. Establishing the encrypted communication session can include bidirectional authentication of devices 102 and 104. For example each device can send to the other a random challenge; the other device can digitally sign the challenge using a private key corresponding to the public key it provided at blocks 238 and 240 and return a response. The device that receives the response can use the previously obtained public key (from blocks 238 and 240) to verify the response. The devices can also exchange information usable to establish a shared secret, from which one or more cryptographic keys ("session keys") can be generated. The session key(s) can be used to encrypt messages communicated between the devices for as long as the session persists. In some embodiments, a "pair verify" process as described in above-referenced U.S. patent application Ser. No. 14/614,914 can be used to establish the encrypted communication session at blocks 242 and 244, with the pair verify process using the public keys that were exchanged at blocks 238 and 240. It should be noted that the encrypted communication session can be established only if the public key exchange at blocks 238 and 240 succeeded.

At block 246, source device 102 can encrypt the requested data object (e.g., data object 120) using a session key established at block 242, and at block 248, source device 102 can send the encrypted data object via the connection on LAN 116. At block 250, destination device 104 can receive the encrypted data object, and at block 254, destination device 104 can decrypt the encrypted data object. At this point, destination device 104 has obtained data object 120, and process 200 can end.

For enhanced security, source device 102 can require that the connection on LAN 116 be continuously maintained during all of the operations inside dashed box 254; if the connection is dropped for any reason, source device 102 can abort the data transfer operation. Thereafter, source device 102 can return to block 228, or a different source device can perform block 228 at any later time.

As noted above, it is possible for multiple source devices to receive a request message from destination device 104. In some embodiments, once destination device 104 establishes a connection to one source device at block 234, destination device 104 can depublish its request on LAN 116. Once the request is depublished, other source devices will not attempt to transfer the data object. (If the transfer fails, destination device 104 can republish the request or return to block 210 to generate a new request.)

In addition, as noted above, in some embodiments, source device 102 may delete or invalidate a stored indicator of an outstanding request for a data object after a timeout period. The timeout period can be selected based on assumptions about how frequently a source device would be expected to connect to a destination device on LAN 116. Where a timeout is used, destination device 104 can generate a new request (with a new random identifier) if the data object is not obtained within the timeout period.

It will be appreciated that process 200 is illustrative and that variations and modifications are possible. In some embodiments, destination device 104 can target the request message sent at block 216 to a specific source device 102, rather than sending request messages to all of the user's devices. Process 200 can be used to transfer any type of data object between two user devices, provided that the two devices are registered to the same user at the cloud service that hosts message relay service 110. The use of two different communication channels (here, a LAN and a message relay service) increases the difficulty of impersonating a legitimate destination device, in proportion to the inherent security of the channels (which depends on the infrastructure of those channels). Further, the use of a local area network as one of the channels requires that the destination device be in local proximity to the source device; the exact proximity required will depend on the range of the local area network. If the transfer is contingent on both devices being connected to a specific LAN, security may be further enhanced to the extent that the user can control or monitor what devices connect to the specific LAN. Thus, for example, a server or server system that provides message relay service 110 might not be able to connect to the LAN without the user knowing.

In other embodiments, process 200 can be executed using any two communication channels that are sufficiently independent of each other, with a public key exchange being communicated via one channel and the transfer of the data object taking place via another channel within a secure session that is established based on the public key exchange. For present purposes, two channels are said to be "independent" of each other if a server or server system (or other system) whose participation is required for the first communication channel is expected to be unable to intervene in or otherwise interfere with the second communication channel. For instance, in the example described above, message relay service 110, which provides the first communication channel, can incorporate a server system at a remote location that communicates with source device 102 and destination device 104 via a wide-area network (e.g., internet 108), while LAN 116 can be a local network that is accessible only to devices located within a particular local area (e.g., within a user's home). Given this arrangement, message relay service 110 (or some other entity impersonating message relay service 110) would not be expected to be able to interfere or intervene in communications via LAN 116. In some embodiments, the two communication channels can use different, independent identifiers or identity verification schemes for the devices that connect to the channels, such that a device attempting to impersonate a user device would have to successfully identify as the user device on both channels.

Device authentication on the channels need not be required, but for security reasons, it may be desirable to require that at least one of the channels (e.g., the channel via which public keys are exchanged) is an authenticated channel. For example, message relay service 110 can maintain a digital-certificate infrastructure (e.g., based on conventional public-key infrastructure technologies, with the provider of message relay service 110 acting as certificate authority) and can require that devices attempting to send (or receive) messages via message relay service 110 present a certificate generated through this infrastructure. Other channels that require authentication of communicating devices can also be used, and a particular authentication infrastructure or methodology is not required. LAN 116 can be, but need not be, an authenticated channel; identity verification can be based on a device's ability to present an access key (e.g., a Wi-Fi network password or key).

In some embodiments, one of the channels (e.g., the channel over which the data object is transferred) can be required to be a local channel, such that devices communicating on the channel would need to be in physical proximity to each other. This can impose an additional difficulty for an impostor of a destination device. A LAN such as a home-based Wi-Fi network can provide a local channel. In some embodiments, the local channel can be an ad hoc peer-topeer network established between source device 102 and destination device 104, or a point-to-point connection such as a Bluetooth connection. Wired connections between the source and destination device can also provide a local communication channel.

It should also be noted that execution of process 200 can be completely invisible to the user, as process 200 does not require user intervention or user notifications. (User intervention can be incorporated, for instance, at block 236 as described above, but is not required.)

Example Use-Case: Sharing of Automated Environment Data

Process 200 or similar processes can be used in any context in which it is desirable to transfer a locally-stored data object from one user device to another. One such context may be related to home automation and control.

Figure 3:
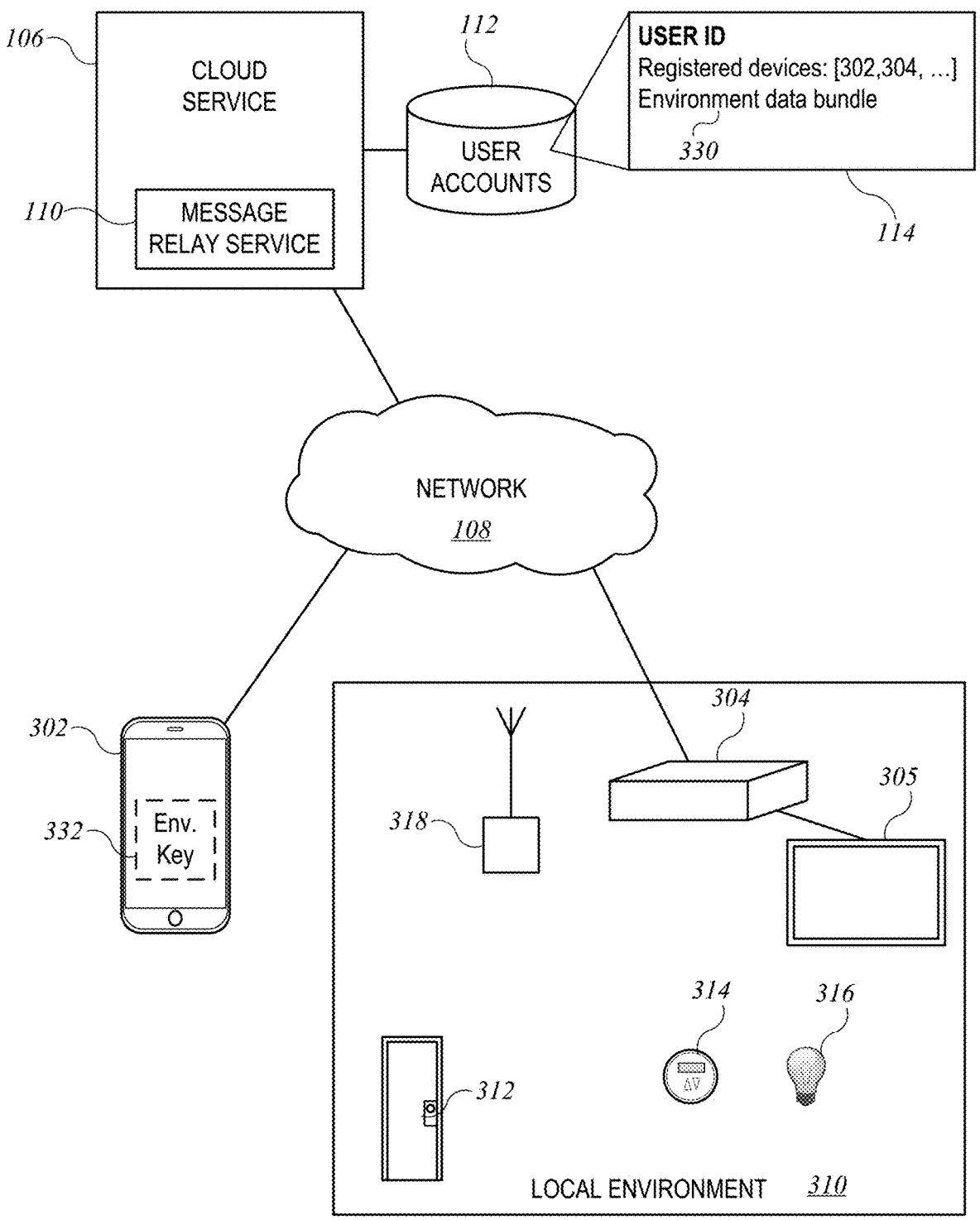
FIG. 3 shows a system according to an embodiment of the present invention.

FIG. 3 shows a system 300 according to an embodiment of the present invention. System 300 can be similar to system 100 of FIG. 1 and can include network 108, cloud service 106, and user devices 302, 304, which can be specific implementations of user devices 102 and 104 described above. In this example, user device 302 is a mobile phone, and user device 304 is a set-top box that can provide video signals to a television (TV) monitor 305.

User device 304 is resident in a local environment 310, which can be, e.g., the user's home. Also resident in local environment 310 are various accessory devices (also referred to as accessories) that can be controlled by user devices such as user devices 302, 304. The term "controller" is used herein to refer to any computing device that is capable of communicating command-and-control messages to accessories (e.g., as described in above-referenced U.S. application Ser. No. 14/614,914). Controllers may also be capable of presenting a user interface to allow a user to indicate desired operations on the accessories. In some embodiments, a controller can be implemented using multiple discrete devices. For example, set-top box 304 may have a limited user interface (or no user interface) on or within its housing, but set-top box 304 can provide a user interface through TV 305 (which can present information and control options to a user) and a remote-control device (not shown) that can provide inputs to set-top box 304.

Any type of accessory device can be controlled. Examples of accessory devices include door lock 312, light fixture 316, and thermostat 314; many other types of accessory devices can be provided. In some instances, a controller can communicate directly with an accessory, e.g., using a wireless transport and protocol such as the Bluetooth® Classic or Bluetooth® Smart communication protocol and standards promulgated by the Bluetooth SIG (referred to herein as "Bluetooth" and "Bluetooth LE"). In other instances, a controller can communicate with an accessory via an intermediary. For example, wireless base station 318 may be present in local environment 310 and may provide a wireless LAN (e.g., a Wi-Fi network) that extends throughout the user's home. Some or all of the accessories in the home may connect to the wireless LAN, allowing controllers connected to the wireless LAN (e.g., set-top box 304) to communicate with these accessories. In some embodiments, a controller may also be able to communicate with the accessories in the home via network 108. For example, cloud service 106 may provide the ability to communicate with accessories (e.g., leveraging message relay service 110). In addition or instead, a controller such as mobile phone 302 that is outside local environment 310 may be able to communicate with a controller that is resident in local environment 310 (e.g., set-top box 304) and that can relay messages between the offsite controller and the accessories. Various communication transports and combinations of transports can be used, and different transports can be used with different devices. Examples include Wi-Fi communication, Bluetooth communication, and wired communication protocols.

A home environment can have multiple controller devices. For example, each person who lives in the home may have his or her own portable device (or devices) that can act as a controller for some or all of the accessories. Different controller devices can be configured to communicate with different subsets of the accessories.

In some embodiments, a uniform accessory protocol can facilitate communication between the various controllers and accessories. The protocol can provide a simple and extensible framework that models an accessory as a collection of services, with each service being defined as a set of characteristics, each of which has a defined value at any given time. Various characteristics can represent various aspects of the accessory's state. For example, in the case of thermostat 314, characteristics can include power (on or off), current temperature, and target temperature. In some embodiments, message formats may be transport-dependent while conforming to the same accessory model. Examples of an accessory model based on services and characteristics are described in above-referenced U.S. Application Ser. No. 14/614,914.

The protocol can further define message formats for controllers to send command-and-control messages (requests) to an accessory and for the accessory 112 to send response messages to the controller. The command-and-control messages can allow a controller to interrogate the current state of accessory characteristics and in some instances to modify the characteristics (e.g., modifying the power characteristic can turn an accessory off or on). Accordingly, any type of accessory, regardless of function or manufacturer, can be controlled by sending appropriate messages. The format can be the same across accessories. Examples of message formats are described in above-referenced U.S. application Ser. No. 14/614,914.

The protocol can further provide notification mechanisms that allow an accessory to selectively notify one or more controllers in the event of a state change. Multiple mechanisms can be implemented, and controllers can register, or subscribe, for the most appropriate notification mechanism for a given purpose. Examples of notification mechanisms are described in above-referenced U.S. application Ser. No. 14/614,914.

In some embodiments, communication with a given accessory can be limited to authorized controllers. The protocol can specify one or more mechanisms (including mechanisms referred to herein as "pair setup" and "pair add") for establishing a "pairing" between a controller and a given accessory under circumstances that provide a high degree of confidence that the user intends for the controller to be able to control the accessory. Pair setup can include an out-of-band information exchange (e.g., the user can enter a numerical or alphanumeric PIN or passcode provided by the accessory into an interface provided by the controller) to establish a shared secret. This shared secret can be used to support secure exchange of "long-term" public keys between the controller and the accessory, and each device can store the long-term public key received from the other, so that an established pairing can be persistent. After a pairing is established, the paired controller is considered authorized, and thereafter, the controller and accessory can go in and out of communication as desired without losing the established pairing. When a controller attempts to communicate with or control an accessory, a "pair verify" process can first be performed to verify that an established pairing exists (as would be the case, e.g., where the controller previously completed pair setup with the accessory). The pair verify process can include each device demonstrating that it is in possession of a long-term private key corresponding to the long-term public key that was exchanged during pair setup and can further include establishing a new shared secret or session key to encrypt all communications during a "pair-verified" session, (also referred to herein as a verified session). During a pair-verified session, a controller that has appropriate privileges can perform a "pair add" process to establish another pairing with the accessory on behalf of another controller. Either device can end a pair-verified session at any time simply by destroying or invalidating its copy of the session key.

In some embodiments, multiple controllers can establish a pairing with the same accessory (e.g., by performing pair setup or by having a pairing added by a controller that previously performed pair setup), and the accessory can accept and respond to communications from any of its paired controllers while rejecting or ignoring communications from unpaired controllers. Examples of pair setup, pair add and pair verify processes, as well as other examples of security-related operations, are described in above-referenced U.S. application Ser. No. 14/614,914.

It will be appreciated that home environment 310 is illustrative and that variations and modifications are possible. Embodiments of the present invention can be implemented in any environment where a user wishes to control one or more accessory devices using a controller device, including but not limited to homes, cars or other vehicles, office buildings, campuses having multiple buildings (e.g., a university or corporate campus), etc. Any type of accessory device can be controlled, including but not limited to door locks, door openers, lighting fixtures or lighting systems, switches, power outlets, cameras, environmental control systems (e.g., thermostats and HVAC systems), kitchen appliances (e.g., refrigerator, microwave, stove, dishwasher), other household appliances (e.g., clothes washer, clothes dryer, vacuum cleaner), entertainment systems (e.g., TV, stereo system), windows, window shades, security systems (e.g., alarms), sensor systems, and so on. A single controller can establish pairings with any number of accessories and can selectively communicate with different accessories at different times. Similarly, a single accessory can be controlled by multiple controllers with which it has established pairings. Any function of an accessory can be controlled by modeling the function as a service having one or more characteristics and allowing a controller to interact with (e.g., read, modify, receive updates) the service and/or its characteristics. Accordingly, protocols and communication processes used in embodiments of the invention can be uniformly applied in any context with one or more controllers and one or more accessories, regardless of accessory function or controller form factor or specific interfaces.

In some embodiments, it may be desirable to share information about accessory pairings and other information related to control and/or automation of local environment 310 among various controller devices that belong to or are operated by the same user. For example, a user may have mobile phone 320, set-top box 304, and other devices (e.g., a laptop computer or tablet computer) that are usable as controllers for accessories in local environment 310. Rather than having to establish a pairing between each controller and each accessory, it may be convenient to automatically share the data among the controllers. In some instances, such automated sharing can be facilitated by storing an "environment data bundle" 330 in the cloud, e.g., at cloud service 106. Environment data bundle 330 can include the long-term public keys of paired accessories, information about the accessories, information about authorized users of the environment data bundle (a home, for instance, may have multiple residents), information pertaining to home automation (e.g., "triggers" that define actions to be automatically taken by a controller in response to detecting certain events and/or conditions), and so on. Environment data bundle 330 can be stored in the user's account 114 at cloud service 106 and automatically synchronized across devices that are registered to the user's account (and to devices registered to accounts of other authorized users of the environment data bundle).

Environment data bundle 330 may contain sensitive information, and it may be desirable to encrypt environment data bundle 330 to protect user privacy. For example, environment data bundle 330 can be stored in encrypted form at cloud service 106 and decrypted locally by the controllers. Where this is the case, each controller that is authorized to use environment data bundle 330 requires a cryptographic key, also referred to herein as "environment key" 332, in order to decrypt environment data bundle 330. (In some cases, a controller may modify the environment data and may also need a key to encrypt the modified environment data bundle before synchronizing it to cloud service 106. Depending on the encryption algorithms used, the same key or different keys can be used for encryption and decryption, and it is to be understood that environment key 332 can include all keys that may be necessary to decrypt and encrypt environment data bundle 330.

In some instances, cloud service 106 may provide a secure key sharing mechanism that can be used to share a key across devices registered to the same user account at cloud service 106. However, there may be cases where it is not possible or desirable to use this mechanism. For instance, different controllers may have different operating system software, and some operating systems may not be compatible with the secure key sharing mechanism. As another example, it may be desirable to avoid providing the key data in any form to cloud service 106.

According to some embodiments of the present invention, process 200 described above can be used to transfer environment key 332 from mobile phone 302 to set-top box 304, with mobile phone 302 operating as source device 102 and set-top box 304 operating as destination device 104. Both mobile phone 302 and set-top box 304 can be registered to the user's account at cloud service 106, and set-top box 304 can use data obtained from cloud service 106 to determine that it needs environment key 332.

Figure 4:
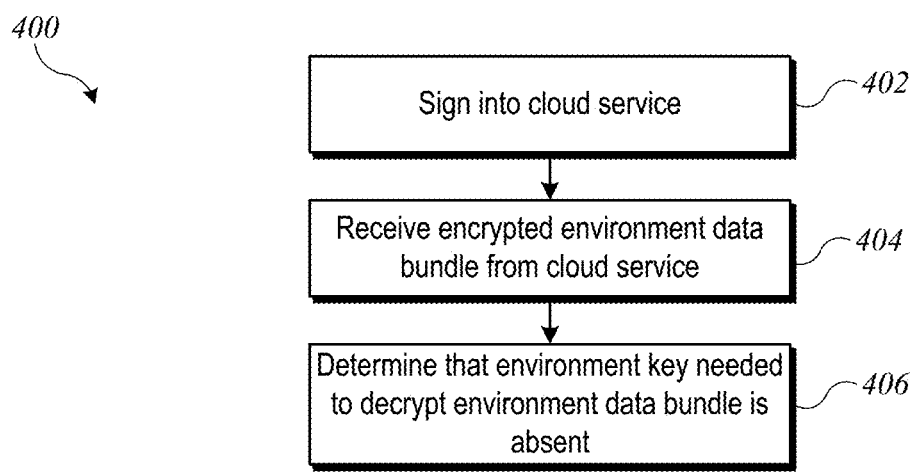
FIG. 4 shows a flow diagram of a process for determining the need for an environment key according to an embodiment of the present invention.

FIG. 4 shows a flow diagram of a process 400 for determining the need for an environment key according to an embodiment of the present invention. Process 400 can be performed, e.g., by set-top box 304 and can correspond to block 210 of process 200 described above.

Process 400 can begin when set-top box 304 accesses user data stored at cloud service 106. For example, at block 402, a user operating set-top box 304 can into an account at cloud service 106. At block 404, set-top box 304 may receive encrypted environment data bundle 330 from cloud service 106. For example, a data synchronization operation that includes synchronizing environment data bundle 330 with set-top box 304 can occur automatically upon sign-in. In other embodiments, the user may be prompted to approve the synchronization. At block 406, set-top box 304 can determine that environment key 332, which is needed to decrypt environment data bundle 330, is absent. For example, set-top box 304 might not have any environment key, or it might have an environment key that is no longer valid or that fails to decrypt environment data bundle 330.

The determination at block 406 can trigger generation of a request for environment key 332 (which is an example of data object 120); the request can proceed according to blocks 212-216 of process 200 (FIG. 2A). For example, set-top box 304 can send a request message requesting environment key 332 via message relay service 110 to mobile phone 302 (and to any other devices registered to the same user account at cloud service 106); this request message can be received by mobile phone 302 regardless of whether it is inside or outside of local environment 310. Set-top box 304 can also publish a request for environment key 332 on the LAN provided by base station 318.

Since users typically take their mobile phones with them when they go places, mobile phone 302 can be expected to move about with the user. If local environment 310 is the user's home (or another environment that the user regularly occupies), it can be expected that sooner or later, mobile phone 302 will enter local environment 310 and connect to the LAN provided by base station 318. When this occurs, mobile phone 302 can detect the published request from set-top box 304 on the LAN provided by base station 318 (corresponding to block 228 of process 200, as shown in FIG. 2B) and can continue process 200 to effect delivery of environment key 332 to set-top box 304.

In some embodiments, secondary verification testing at block 236 can leverage the fact that the particular data object requested is environment key 332, which is associated with environment data bundle 330. For example, mobile device 302 can determine whether it is in fact in local environment 310 based on the ability to communicate with accessories identified in environment data bundle 330. It is assumed that at least some of the accessories identified in environment data bundle 330 are installed in local environment 310 and would not leave local environment 310 in the normal course of events. For instance, door lock 312, thermostat 314, and light fixture 316 can be installed in particular locations in the user's home, and it can be expected that these accessories would stay in the locations at which they were installed.

Figure 5:
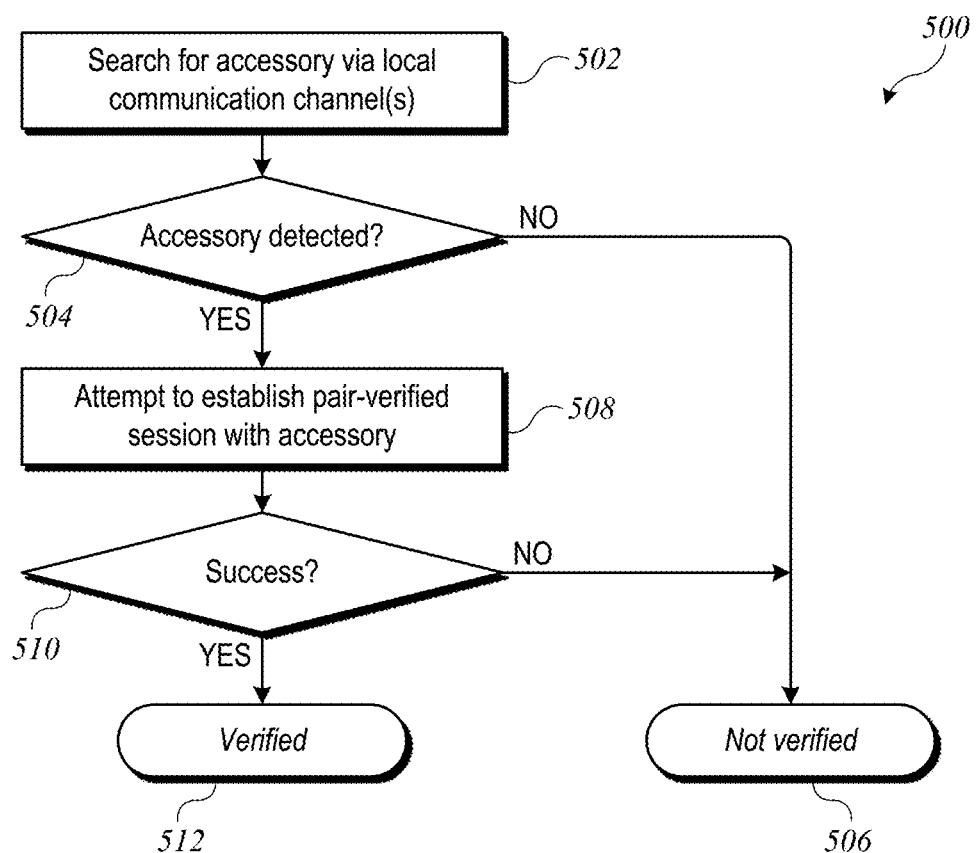
FIG. 5 shows a flow diagram of a process that can be used for secondary verification testing according to an embodiment of the present invention.

FIG. 5 shows a flow diagram of a process 500 that can be used for secondary verification testing according to an embodiment of the present invention. Process 500 can be used, e.g., by mobile device 302 (or other source device 102) at block 236 of process 200. At block 502, mobile device 302 can search for an accessory associated with environment data bundle 330 on one or more local communication channels. The local communication channels can include the LAN provided by base station 318 and/or other channels such as Bluetooth communication channels. If, at block 504, the accessory is not detected, then the location is not verified at block 506. If the accessory is detected, then at block 508, mobile device 302 can attempt to establish a pair-verified session with the accessory (e.g., by performing a pair-verify process as described above). If, at block 510, the attempt succeeds, then the location can be verified at block 512; if not, then the location is not verified at block 506. In some embodiments, other techniques for authenticating or verifying the identity of a detected accessory can be substituted for the pair-verify process.

In some embodiments, process 500 can be repeated to determine the reachability of any or all accessories that are expected to be reachable in local environment 310. Based on the aggregate results, mobile device 302 can make a final determination as to whether to trust that it is in local environment 310. For example, in some embodiments, establishing trust can be based on whether a minimum number (or fraction) of expected accessories are reachable. In some embodiments, establishing trust may require that one or more specific accessories be reachable. Various combinations of criteria can be defined. In some embodiments, additional tests can be performed; for instance, in some embodiments, mobile device 302 may be able to request that one or more of the reachable accessories indicate whether it can detect the presence of set-top box 304.

Figure 6:
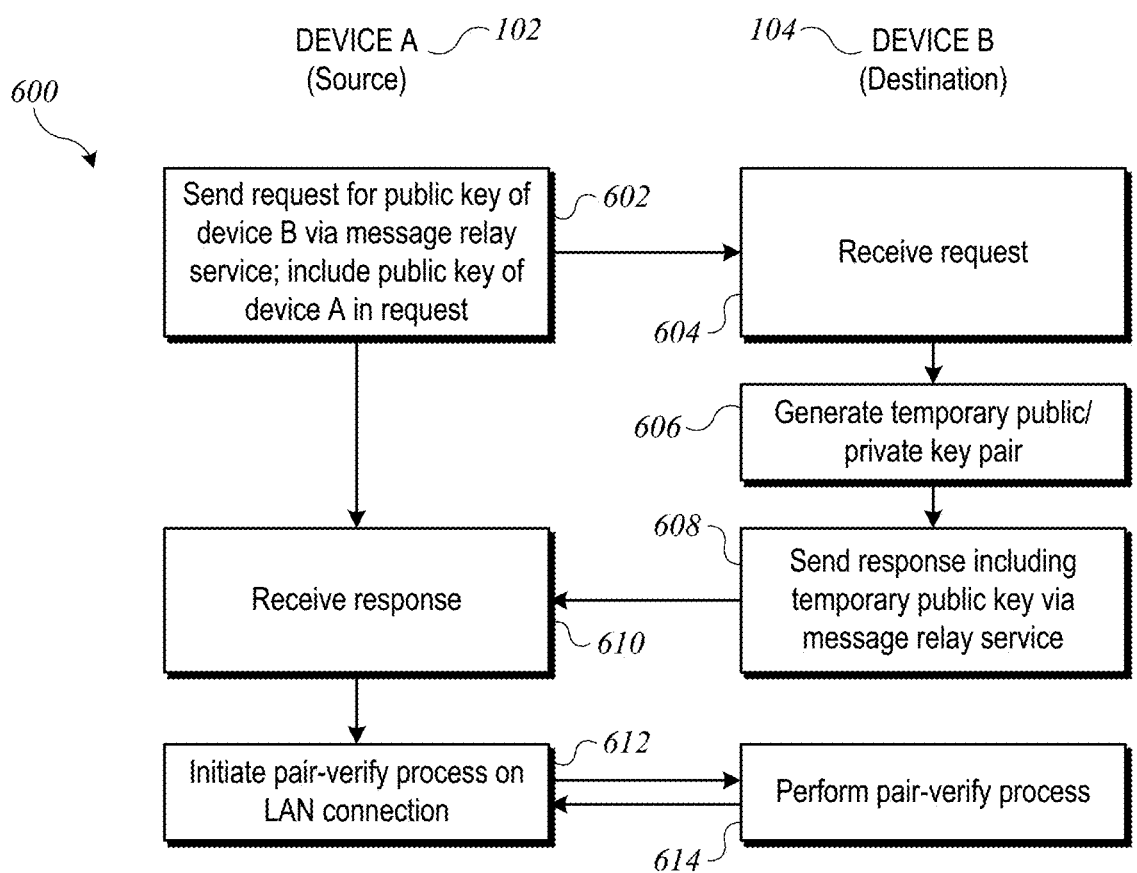
FIG. 6 shows a flow diagram of a process for exchange of public keys according to an embodiment of the present invention.

Assuming that the secondary verification test succeeds, mobile device 302 and set-top box 304 can exchange public keys via message relay service 110. FIG. 6 shows a flow diagram of a process 600 for exchange of public keys according to an embodiment of the present invention. Process 600 can be used, e.g., to implement blocks 238 and 240 of process 200 described above.

At block 602, source device 102 (which can be, e.g., mobile device 302) can send a request for the public key of destination device 104 (which can be, e.g., set-top box 304) via message relay service 110. The request can include a public key of source device 102. In some embodiments, this can be the long-term public key that source device 102 exchanges with accessories in local environment 310 in order to establish a pairing.

At block 604, destination device 104 can receive the request. At block 606, destination device 104 can generate a temporary public/private key pair. Conventional key-generation algorithms such as Ed25519 or the like can be used. At block 608, destination device 104 can send the public key of the temporary pair in a response to the message received at block 604. The response can be sent via message relay service 110.

At block 610, source device 102 can receive the response. In some embodiments, if a response is not received within a timeout period, source device 102 can quit the key exchange process At block 612, source device 102 can use the received response to initiate a pair-verify process with destination device 104 on the local area network (e.g., the LAN provided by base station 318 of FIG. 3), and at block 614, destination device 104 can participate in the pair-verify process. The pair-verify process can be similar or identical to the pair-verify process used with accessories. This process can correspond to blocks 242 and 244 of process 200 described above.

The systems and processes described herein are illustrative, and variations and modifications are possible. For example, in any context where a source device has information defining a local environment populated with installed accessories, the source device can use process 500 to determine whether it is in the local environment, allowing the sharing of data objects between user devices to be limited to a specific local environment. This local environment can be the user's home or other location where it is unlikely that an unauthorized individual would be able to place an impostor destination device. Any type of data object can be shared, including but not limited to cryptographic keys. In some embodiments, any device that can be registered to a user account at a cloud service can act as a source device or a destination device for a data object. In other embodiments, devices may be restricted in their roles based on device type. For example, a device such as a set-top box may be permitted to act as a destination but not as a source; a mobile phone may be permitted to act as a source but not a destination. In some embodiments, there can be a single designated source device (e.g., the user's mobile phone), and other user devices may be precluded from providing data objects to a destination device.

Example Devices

User devices (including source and destination devices), controllers, and accessory devices described herein can be implemented in electronic devices that can be of generally conventional design. Such devices can be adapted to conform to a uniform accessory protocol that supports command-and-control operations by which a controller (a first electronic device) can control operation of an accessory (a second electronic device). In some instances, a device can combine features or aspects of a controller and an accessory, e.g., in the case of a coordinator or proxy as described above.

Figure 7:
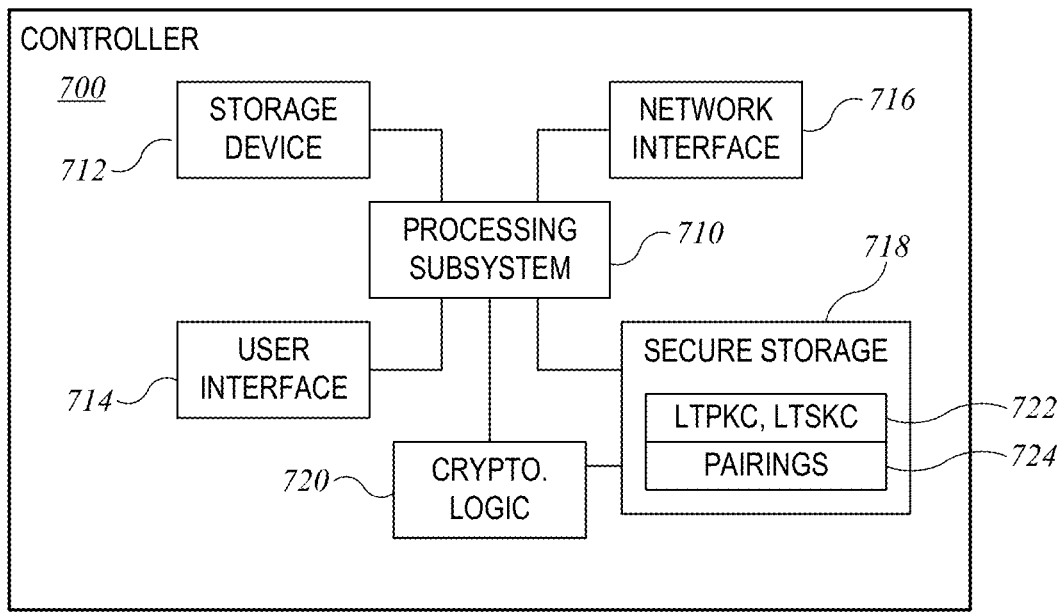
FIG. 7 shows a simplified block diagram of a user device according to an embodiment of the present invention.

FIG. 7 shows a simplified block diagram of a controller 700, which can be a user device, according to an embodiment of the present invention. Controller 700 can implement any or all of the controller functions, behaviors, and capabilities described herein, including operations of a source device and/or destination device, as well as other functions, behaviors, and capabilities not expressly described. Controller 700 can include processing subsystem 710, storage device 712, user interface 714, communication interface 716, secure storage module 718, and cryptographic logic module 720. Controller 700 can also include other components (not explicitly shown) such as a battery, power controllers, and other components operable to provide various enhanced capabilities. In various embodiments, controller 700 can be implemented in a desktop computer, laptop computer, tablet computer, smart phone, other mobile phone, wearable computing device, or other systems having any desired form factor. Further, as noted above, controller 700 can be implemented partly in a base station and partly in a mobile unit that communicates with the base station and provides a user interface.

Storage device 712 can be implemented, e.g., using disk, flash memory, or any other non-transitory storage medium, or a combination of media, and can include volatile and/or non-volatile media. In some embodiments, storage device 712 can store one or more application and/or operating system programs to be executed by processing subsystem 710, including programs to implement various operations described above as being performed by a controller. For example, storage device 712 can store a uniform controller application that can read an accessory description record and generate a graphical user interface for controlling the accessory based on information therein (e.g., as described in above-referenced U.S. application Ser. No. 14/614,914). In some embodiments, portions (or all) of the controller functionality described herein can be implemented in operating system programs rather than applications. In some embodiments, storage device 712 can also store apps designed for specific accessories or specific categories of accessories (e.g., an IP camera app to manage an IP camera accessory or a security app to interact with door lock accessories). Storage device 712 can also store other data produced or used by controller 700 in the course of its operations, including trigger data objects and/or other data pertaining to an environment model.

User interface 714 can include input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 714 to invoke the functionality of controller 700 and can view and/or hear output from controller 700 via output devices of user interface 714.

Processing subsystem 710 can be implemented as one or more integrated circuits, e.g., one or more single-core or multi-core microprocessors or microcontrollers, examples of which are known in the art. In operation, processing system 710 can control the operation of controller 700. In various embodiments, processing subsystem 710 can execute a variety of programs in response to program code and can maintain multiple concurrently executing programs or processes. At any given time, some or all of the program code to be executed can be resident in processing subsystem 710 and/or in storage media such as storage device 712.

Through suitable programming, processing subsystem 710 can provide various functionality for controller 700. For example, in some embodiments, processing subsystem 710 can implement various processes (or portions thereof) described above as being implemented by a controller. Processing subsystem 710 can also execute other programs to control other functions of controller 700, including application programs that may be stored in storage device 712. In some embodiments, these application programs may interact with an accessory, e.g., by generating messages to be sent to the accessory and/or receiving responses from the accessory. Such interactions can be facilitated by an accessory management daemon and/or other operating system processes, e.g., as described above.

Communication interface 716 can provide voice and/or data communication capability for controller 700. In some embodiments communication interface 716 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 716 can provide wired network connectivity (e.g., Ethernet) in addition to or instead of a wireless interface. Communication interface 716 can be implemented using a combination of hardware (e.g., driver circuits, antennas, modulators/demodulators, encoders/decoders, and other analog and/or digital signal processing circuits) and software components. In some embodiments, communication interface 716 can support multiple communication channels concurrently or at different times, using the same transport or different transports.

Secure storage module 718 can be an integrated circuit or the like that can securely store cryptographic information for controller 700. Examples of information that can be stored within secure storage module 718 include the controller's long-term public and secret keys 722 (LTPKC, LTSKC as described above), and a list of paired accessories 724 (e.g., a lookup table that maps accessory ID to accessory long-term public key LTPKA for accessories that have completed a pair setup or pair add process as described above).

In some embodiments, cryptographic operations can be implemented in a cryptographic logic module 720 that communicates with secure storage module 718. Physically, cryptographic logic module 720 can be implemented in the same integrated circuit with secure storage module 718 or a different integrated circuit (e.g., a processor in processing subsystem 710) as desired. Cryptographic logic module 720 can include various logic circuits (fixed or programmable as desired) that implement or support cryptographic operations of controller 700, including any or all cryptographic operations described above. Secure storage module 718 and/or cryptographic logic module 720 can appear as a "black box" to the rest of controller 700. Thus, for instance, communication interface 716 can receive a message in encrypted form that it cannot decrypt and can simply deliver the message to processing subsystem 710. Processing subsystem 710 may also be unable to decrypt the message, but it can recognize the message as encrypted and deliver it to cryptographic logic module 720. Cryptographic logic module 720 can decrypt the message (e.g., using information extracted from secure storage module 718) and determine what information to return to processing subsystem 710. As a result, certain information can be available only within secure storage module 718 and cryptographic logic module 720. If secure storage module 718 and cryptographic logic module 720 are implemented on a single integrated circuit that executes code only from an internal secure repository, this can make extraction of the information extremely difficult, which can provide a high degree of security. Other implementations are also possible.

Figure 8:
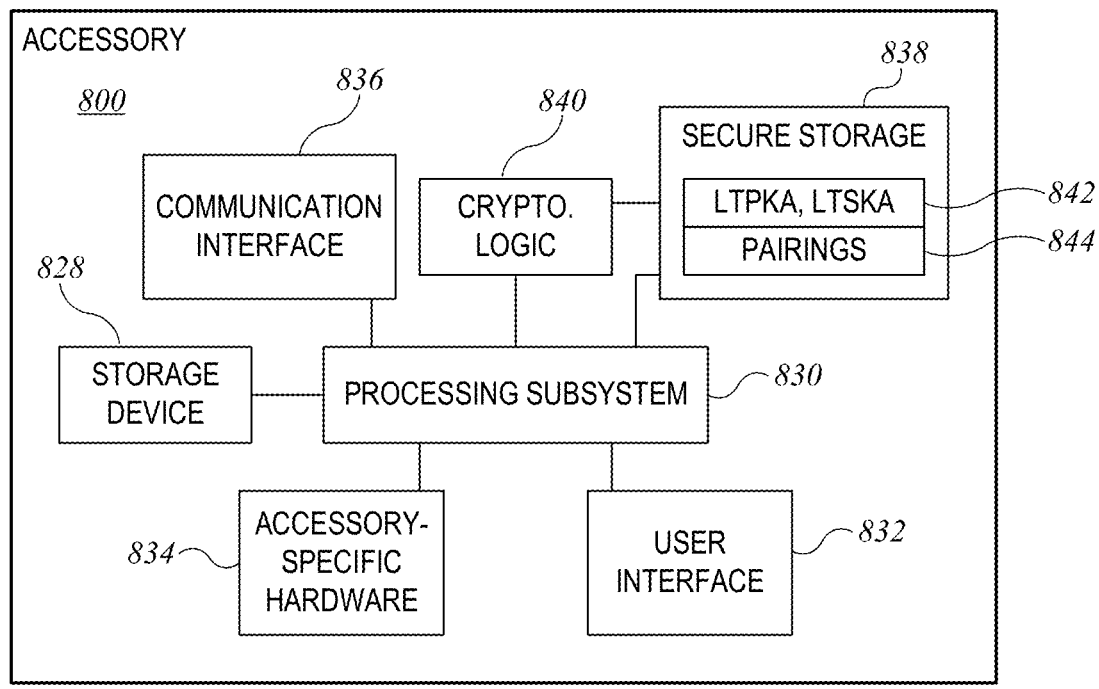
FIG. 8 shows a simplified block diagram of an accessory according to an embodiment of the present invention.

FIG. 8 shows a simplified block diagram of an accessory 800 according to an embodiment of the present invention. Accessory 800 can implement any or all of the accessory functions, behaviors, and capabilities described herein, as well as other functions, behaviors, and capabilities not expressly described. Accessory 800 can include storage device 828, processing subsystem 830, user interface 832, accessory-specific hardware 834, communication interface 836, secure storage module 838, and cryptographic logic module 840. Accessory 800 can also include other components (not explicitly shown) such as a battery, power controllers, and other components operable to provide various enhanced capabilities.

Accessory 800 is representative of a broad class of accessories that can be operated by a controller such as controller 700, and such accessories can vary widely in capability, complexity, and form factor. Various accessories may include components not explicitly shown in FIG. 8, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 828 can be implemented, e.g., using disk, flash memory, or any other non-transitory storage medium, or a combination of media, and can include volatile and/or non-volatile media. In some embodiments, storage device 828 can store one or more programs (e.g., firmware) to be executed by processing subsystem 830, including programs to implement various operations described above as being performed by an accessory, as well as operations related to particular accessory behaviors. Storage device 828 can also store an accessory object or accessory definition record that can be furnished to controller devices, e.g., during device discovery as described in above-referenced U.S. application Ser. No. 14/614,914. Storage device 828 can also store accessory state information and any other data that may be used during operation of accessory 800.

Processing subsystem 830 can include, e.g., one or more single-core or multi-core microprocessors and/or microcontrollers executing program code to perform various functions associated with accessory 800. For example, processing subsystem 830 can implement various processes (or portions thereof) described above as being implemented by an accessory, e.g., by executing program code stored in storage device 828. Processing subsystem 830 can also execute other programs to control other functions of accessory 830. In some instances programs executed by processing subsystem 830 can interact with a controller (e.g., controller 700), e.g., by generating messages to be sent to the controller and/or receiving messages from the controller.

User interface 832 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular accessory 800, a user can operate input devices of user interface 832 to invoke functionality of accessory 800 and can view and/or hear output from accessory 800 via output devices of user interface 832. Some accessories may provide a minimal user interface or no user interface. at all. Where the accessory does not have a user interface, a user can still interact with the accessory using a controller (e.g., controller 700).

Accessory-specific hardware 834 can include any other components that may be present in accessory 800 to enable its functionality. For example, in various embodiments accessory-specific hardware 834 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of accessory functionality can be supported by providing appropriate accessory-specific hardware 834 and that accessory-specific hardware can include mechanical as well as electrical or electronic components.

Communication interface 836 can provide voice and/or data communication capability for accessory 800. In some embodiments communication interface 836 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 836 can provide wired network connectivity (e.g., Ethernet) in addition to or instead of a wireless interface. Communication interface 836 can be implemented using a combination of hardware (e.g., driver circuits, antennas, modulators/demodulators, encoders/decoders, and other analog and/or digital signal processing circuits) and software components. In some embodiments, communication interface 836 can support multiple communication channels concurrently or at different times, using the same transport or different transports.

Secure storage module 838 can be an integrated circuit or the like that can securely store cryptographic information for accessory 800. Examples of information that can be stored within secure storage module 838 include the accessory's long-term public and secret keys 842 (LTPKA, LTSKA as described above), and a list of paired controllers 844 (e.g., a lookup table that maps controller ID to controller long-term public key LTPKC for controllers that have completed a pair setup or pair add process as described above). In some embodiments, secure storage module 838 can be omitted; keys and lists of paired controllers can be stored in storage device 828.

In some embodiments, cryptographic operations can be implemented in a cryptographic logic module 840 that communicates with secure storage module 838. Physically, cryptographic logic module 840 can be implemented in the same integrated circuit with secure storage module 838 or a different integrated circuit (e.g., a processor in processing subsystem 830) as desired. Cryptographic logic module 840 can include various logic circuits (fixed or programmable as desired) that implement or support cryptographic operations of accessory 800, including any or all cryptographic operations described above. Secure storage module 838 and/or cryptographic logic module 840 can appear as a "black box" to the rest of accessory 800. Thus, for instance, communication interface 836 can receive a message in encrypted form that it cannot decrypt and can simply deliver the message to processing subsystem 830. Processing subsystem 830 may also be unable to decrypt the message, but it can recognize the message as encrypted and deliver it to cryptographic logic module 840. Cryptographic logic module 840 can decrypt the message (e.g., using information extracted from secure storage module 838) and determine what information to return to processing subsystem 830. As a result, certain information can be available only within secure storage module 838 and cryptographic logic module 840. If secure storage module 838 and cryptographic logic module 840 are implemented on a single integrated circuit that executes code only from an internal secure repository, this can make extraction of the information extremely difficult, which can provide a high degree of security. Other implementations are also possible.

Accessory 800 can be any electronic apparatus that interacts with controller 700. In some embodiments, controller 700 can provide remote control over operations of accessory 800 as described above. For example controller 700 can provide a remote user interface for accessory 800 that can include both input and output controls (e.g., a display screen to display current status information obtained from accessory 800 and an input control such as a touchscreen overlay to allow changes to the status information). Controller 700 in various embodiments can control any function of accessory 800 and can also receive data from accessory 800.

It will be appreciated that the system configurations and components described herein are illustrative and that variations and modifications are possible. It is to be understood that an implementation of controller 700 can perform all operations described above as being performed by a controller and that an implementation of accessory 800 can perform any or all operations described above as being performed by an accessory. A proxy, bridge, tunnel, or coordinator can combine components of controller 700 and accessory 800, using the same hardware or different hardware as desired. The controller and/or accessory may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular accessory can have some functionality that is not accessible or invocable via a particular controller but is accessible via another controller or by interacting directly with the accessory.

Further, while the controller and accessory are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Further Embodiments

While the invention has been described with respect to specific embodiments, one skilled in the art will recognize that numerous modifications are possible. Any type of data object can be transferred using processes described herein or similar processes, and the source device and destination device can be any two devices associated with a particular user. Processes described herein use a combination of two separate and independent communication channels to verify the identity of the devices (particularly the identity of the destination device, to avoid the risk of providing a data object to an unauthorized device), which provides enhanced security, as an impostor attempting to obtain the data object would need to be able to impersonate the destination device on both communication channels. Where one of the channels is a local area network, some degree of physical proximity between the devices may be necessary, and this can provide an additional measure of protection.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method, comprising:
   transmitting, by a destination device and to one or more other devices, a message requesting a data object via a first communication channel;
   determining, by the destination device, that the destination device is within a predetermined physical proximity to a source device;
   after determining that the destination device is within the predetermined physical proximity to the source device, establishing, by the destination device, a second communication channel with the source device of the one or more other devices via a local network, wherein the second communication channel is different from the first communication channel, wherein the destination device and the source device are associated with a same user account; and
   while the second communication channel persists:
   exchanging, by the destination device, a first public key of the destination device and a second public key of the source device with the source device via the first communication channel;
   creating, by the destination device, a secure session for exchanging data with the source device via the second communication channel, wherein the secure session is established using the first public key and the second public key;
   receiving, by the destination device, via the secure session, an encrypted version of the data object from the source device; and
   decrypting, by the destination device, the received encrypted version of the data object using a session key generated during establishment of the secure session.

2. The method of claim 1, wherein the data object corresponds to a key usable to decrypt an encrypted data bundle, wherein the encrypted data bundle is synchronized at a cloud-based service between the source device and the destination device.

3. The method of claim 2, wherein the cloud-based service also provides the first communication channel.

4. The method of claim 1, wherein the first communication channel provides authenticated communication between registered devices via a wide-area network and wherein the source device and the destination device are both registered devices.

5. The method of claim 1, wherein the local network comprises a Wi-Fi network.

6. The method of claim 1, wherein the local network comprises a Bluetooth communication channel.

7. The method of claim 1, further comprising:
   generating, by the destination device, a temporary public/private cryptographic key pair,
   wherein the first public key is a public key of the temporary public/private cryptographic key pair.

8. The method of claim 1, wherein exchanging the first public key and the second public key includes:
   receiving, by the destination device via the first communication channel, a key request message from the source device, the key request message including the second public key of the source device; and
   sending, by the destination device via the first communication channel, a key response message to the source device, the key response message including the first public key of the destination device.

9. The method according to claim 1, wherein the first communication channel is a Wide Area Network (WAN) communication channel, and wherein the second communication channel is a Local Area Network (LAN) communication channel.

10. The method according to claim 1, wherein the data object is a cryptographic key.

11. The method according to claim 1, wherein the exchanging the first public key and the second public key is performed via the first communication channel that is independent of the second communication channel that is used to send the data object.

12. An electronic device, comprising:
    a memory;
    a network interface to communicate via one or more networks including at least a local network; and
    one or more processors coupled to the network interface and the memory, the one or more processors being configured to:
    transmit to one or more other devices, a message requesting a data object via a first communication channel;
    determining that the electronic device is within a predetermined physical proximity to a source device;
    after determining that the electronic device is within the predetermined physical proximity to the source device, establish a second communication channel with the source device of the one or more other devices via the local network, wherein the second communication channel is independent of the first communication channel, wherein the electronic device and the source device are associated with a same user account, and wherein the electronic device is a destination device; and
    while the second communication channel persists:
    exchange with the source device a first public key of the destination device and a second public key of the source device via the first communication channel;
    create a secure session for exchanging data with the source device via the second communication channel, wherein the secure session is established using the first public key and the second public key;
    receive, via the secure session, an encrypted version of the data object from the source device; and
    decrypt the received encrypted version of the data object using a session key generated during establishment of the secure session.

13. The electronic device of claim 12, wherein the data object corresponds to a key usable to decrypt an encrypted data bundle, wherein the encrypted data bundle is synchronized at a cloud-based service between the source device and the destination device.

14. The electronic device of claim 12, wherein the first communication channel provides authenticated communication between registered devices via a wide-area network and wherein the source device and the destination device are both registered devices.

15. The electronic device of claim 12, wherein the one or more processors are further configured to generate a temporary public/private cryptographic key pair, wherein the first public key is a public key of the temporary public/private cryptographic key pair.

16. A non-transitory computer-readable storage medium having stored thereon program instructions that, when executed by one or more processors of a source device, cause the source device to perform operations comprising:
    receiving, via a first communication channel, a message from a destination device requesting a data object;

establishing a second communication channel with the destination device via a local network, wherein the second communication channel is independent of the first communication channel, wherein the destination device and the source device are associated with a same user account, wherein the destination device determines that the destination device is within a predetermined physical proximity to the source device prior to establishing the second communication channel; and while the second communication channel persists:

exchanging, with the destination device, a first public key of the destination device and a second public key of the source device via the first communication channel;

creating a secure session for exchanging data with the destination device via the second communication channel, wherein the secure session is established using the first public key and the second public key; and sending, via the secure session, an encrypted version of the data object to the destination device, the encrypted version of the data object configured to be decrypted using a session key generated during establishment of the secure session.

17. The computer-readable storage medium of claim 16, further comprising performing a secondary test to verify an authenticity of the destination device while the second communication channel persists and prior to exchanging the first and second public keys.

18. The computer-readable storage medium of claim 17, wherein performing the secondary test includes communicating with a third device, other than the destination device, that is expected to be present when the source device is connected to the local network.

19. The computer-readable storage medium of claim 18, wherein the third device is an accessory that is controllable by the source device.

20. The computer-readable storage medium of claim 16, wherein the data object corresponds to a key usable to decrypt an encrypted data bundle, wherein the encrypted data bundle is synchronized at a cloud-based service between the source device and the destination device.

21. The computer-readable storage medium of claim 20, wherein the cloud-based service also provides the first communication channel.

22. The computer-readable storage medium of claim 16, wherein the first communication channel provides authenticated communication between registered devices via a wide-area network and wherein the source device and the destination device are both devices registered with an automated environment associated with a user.

* * * * *